Figure 1:
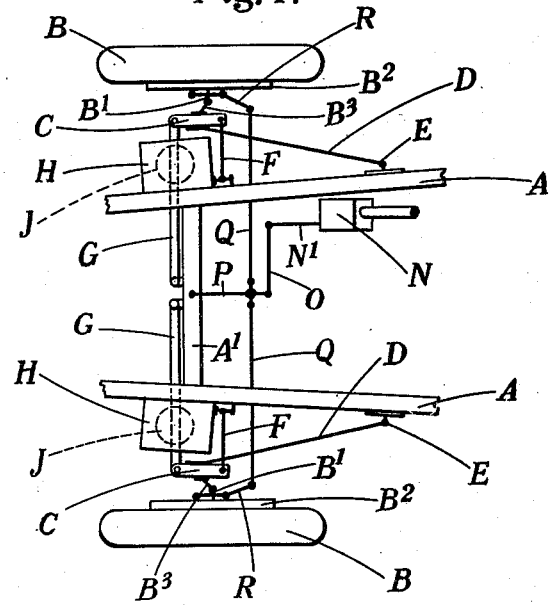

Aug. 4, 1936.　　A. H. G. GIRLING　　2,049,904
VEHICLE SUSPENSION
Filed March 7, 1935　　4 Sheets-Sheet 1

INVENTOR,
A.H.G. GIRLING,
BY
Blair & Kilcoyne.
ATTORNEYS

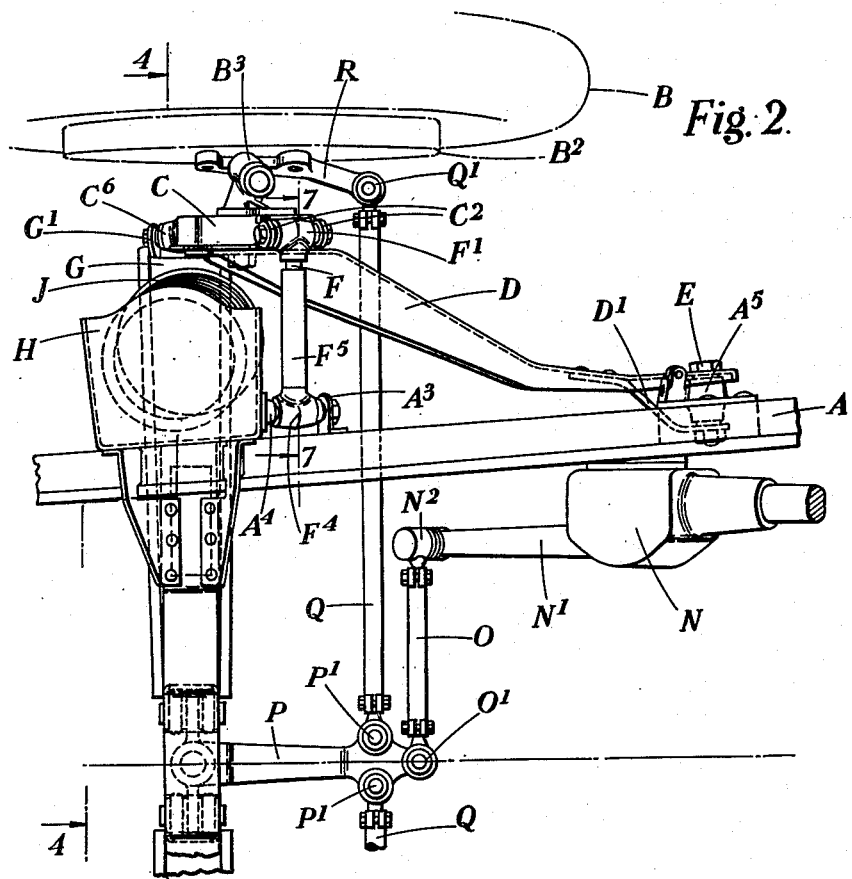
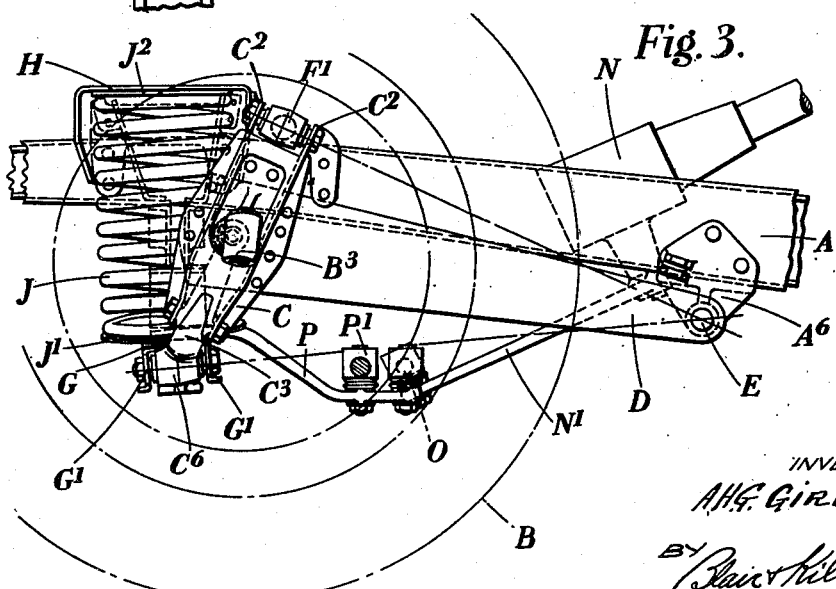

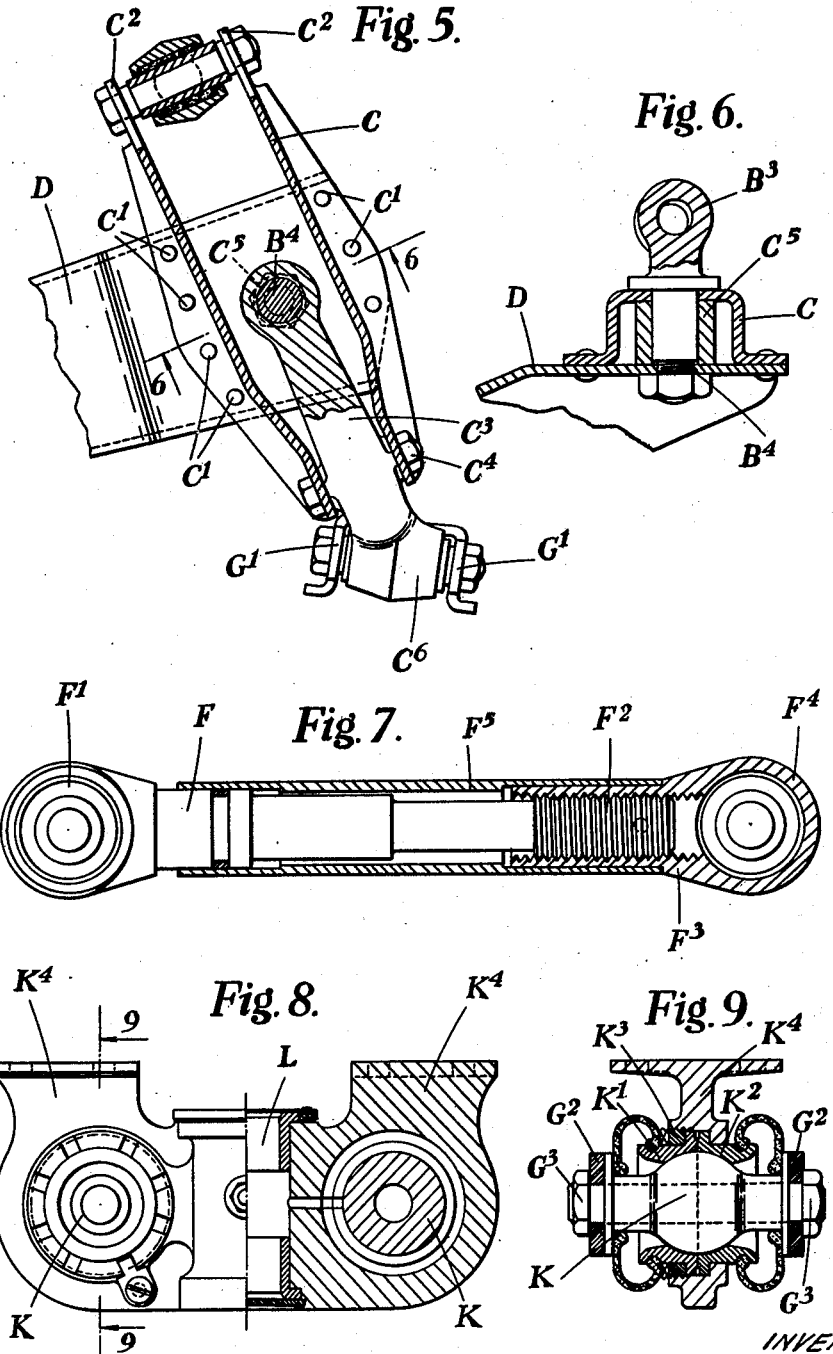

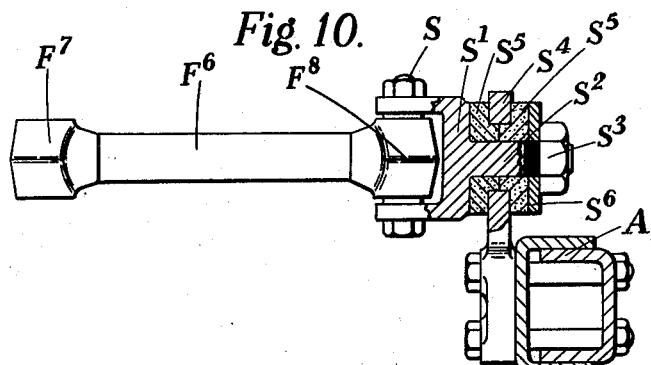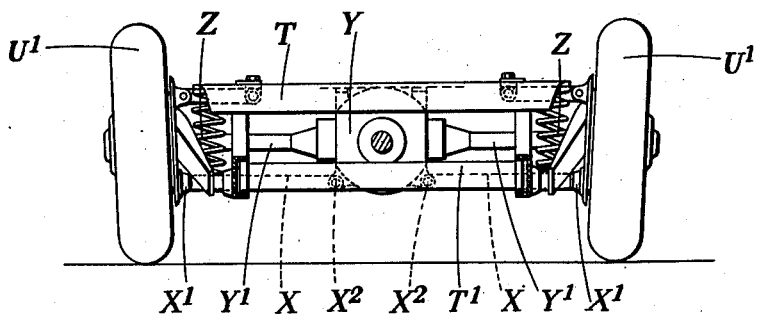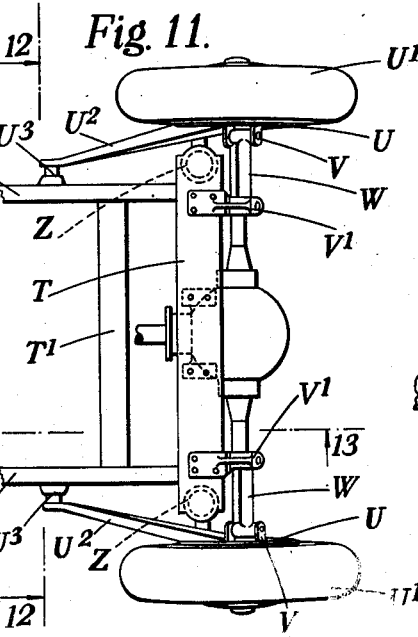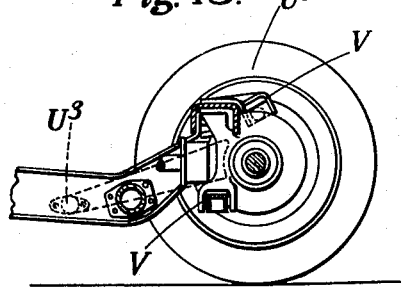

Patented Aug. 4, 1936

2,049,904

UNITED STATES PATENT OFFICE 2,049,904

VEHICLE SUSPENSION

Albert Henry Godfrey Girling, London, England, assignor, by mesne assignments, to Andre (Components) Limited, London, England, a company of Great Britain Application March 7, 1935, Serial No. 9,869
In Great Britain March 8, 1934

12 Claims. (Cl. 280—124)

This invention relates to vehicle suspension apparatus of the kind in which the vehicle chassis or frame is supported from each of a pair of front or rear wheels without a rigid axle connecting these wheels, this type of suspension usually being termed independent suspension, and more particularly to that type of independent suspension in which each road wheel is connected to the vehicle chassis frame or the like by means of three radius arms, one lying substantially parallel to the length of the vehicle and hereinafter termed the longitudinal arm, while the others, hereinafter termed upper and lower links, lie one above the other and transversely to the length of the vehicle. In such apparatus each longitudinal arm is rigidly connected at one end to a member (hereinafter called the wheel carrying member) which carries the wheel and, in the case of steerable wheels, has the deflectable stub axle pivoted to it, while the other end of the longitudinal arm is pivoted to the vehicle chassis frame or the like, each of the links being pivoted at one end to the vehicle chassis frame or the like and at its other end to the wheel carrying member.

In such vehicle suspension apparatus the movements of the wheel carrying member in relation to the chassis frame are complex as the wheel rises and falls and, according to the present invention, the arrangement is such as not only to permit of the relatively large pivotal movement about an axis necessary at each pivotal joint, such movement being hereinafter referred to as the main pivotal movement, but to allow also as regards the longitudinal arm, for the movement of the wheel carrying member other than plain vertical movement under the control of the links and in the case of each of the links for the arcuate movement of the wheel carrying member about the pivot of the longitudinal arm. For the sake of convenience, the movements other than the main pivotal movements will be referred to as "universal movements".

In one spring suspension apparatus of the above kind according to the present invention the upper link lies in a vertical transverse plane which is nearer to the pivot of the longitudinal arm than the vertical transverse plane in which lies the lower link and one or more helical suspension springs are disposed on the side of the upper link remote from that pivotal axis. Further, each link is preferably so constructed and connected respectively to the wheel carrying member and the vehicle frame or chassis as to permit freely the angular movement about a transverse axis of the wheel carrying member relatively to the chassis due to its control by the longitudinal arm. Thus, one or each of the links may be formed in two parts so connected together as to permit free relative rotation between the two ends of the link or the link may be formed in one part and may be connected at one or other of its ends to the required member by means of a ball or like joint permitting universal pivotal movement.

In any case one or each of the links may be adjustable in length and this may be provided for by forming a link in two interengaging screw-threaded parts which provides not only for adjustments in length but also permits free relative angular movement between the ends of the link.

Any of the joints between the ends of the links and the members to which they are connected which are not of the ball and socket or like type permitting free universal pivotal movement should be of the kind incorporating a rubber or like flexible element, for example of the kind comprising a pin or sleeve surrounded by a socket so as to leave an annular space between them in which is disposed a bushing of rubber or like resilient material having its radial dimensions so reduced by compression between these parts as to adhere to both of them while permitting pivotal movement about the axis of the socket by reason of intermolecular deformation which can take place in the rubber, and also a small degree of universal movement. For the sake of convenience joints of this type including a radially compressed rubber or like material will hereinafter be referred to as "rubber joints".

Where the joint connecting one or each end of either link to the wheel carrying member or the chassis frame is a "rubber joint" of the kind referred to, the axis of the joint passes through or adjacent to the main pivotal axis of the joint connecting the longitudinal arm to the chassis frame.

As regards the joint connecting the longitudinal arm to the vehicle chassis frame, this may be of the ball and socket or like universal type but is also preferably a rubber joint and, in this case, the arm itself may be made sufficiently flexible to allow for at least a part of the torsional deflection to which the end thereof secured to the wheel carrying member is subject, the remaining portion of this torsional deflection being taken up by the rubber joint. Alternatively, the joint may be of the metal-to-metal journal type, in which case the arm may be made sufficiently flexible to allow for the whole of the small torsional deflection to which the end thereof secured to the wheel carrying member is subject and for the transverse movement of the wheel carrying member relatively to the frame.

Preferably the helical suspension spring or springs extend between a bracket or other seating secured to the chassis and either a seating on the lower link or a seating on the wheel carrying member, and in either case this seating is preferably inclined to the plane in which the seating for the upper end of the spring lies when the suspension apparatus is in its normal position in such a manner that these planes come nearer and nearer to parallelism and the angular distortion of the spring thus decreases progressively as the spring is compressed due to upward movement of the wheel carrying member relatively to the chassis frame from such normal position. In some cases, the wheel may move upward beyond the point at which there is parallelism between the seatings for the ends of the spring but this condition should only arise when the spring is compressed considerably beyond its normal compression.

The invention may be carried into practice in various ways but one construction according to this invention is illustrated by way of example in the accompanying drawings, in which—

Figure 4:
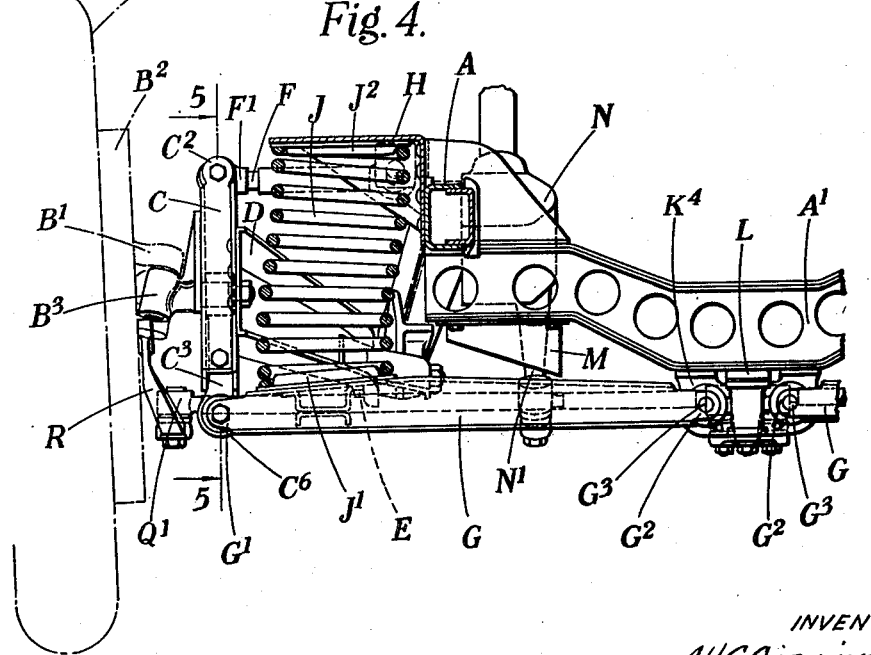

Figure 1 is a diagrammatic plan of the suspension apparatus as applied to the two front wheels of a vehicle, Figure 2 is a plan on an enlarged scale of the suspension apparatus shown in Figure 1, as regards one wheel, Figure 3 is a side elevation of the suspension apparatus shown in Figure 2, Figure 4 is a front elevation of the suspension apparatus shown in Figures 2 and 3, partly in section on the line 4—4 of Figure 2, Figure 5 is a side elevation, partly in section on the line 5—5 of Figure 4, showing a detail of the wheel carrying member employed in the suspension apparatus shown in Figures 2, 3 and 4, Figure 6 is a section on the line 6—6 of Figure 5, Figure 7 is a front elevation partly in section showing the structure of the upper link employed in the suspension apparatus shown in Figures 2, 3 and 4, the section being taken on the line 7—7 of Figure 2, Figure 8 is a front elevation partly in section showing the member on the chassis to which the lower links are pivoted in the construction shown in Figures 2, 3 and 4, Figure 9 is a section on the line 9—9 of Figure 8, Figure 10 is a front elevation showing an alternative arrangement which may be used for connecting the end of one of the links to its associated part, this arrangement being shown as applied to the inner end of the upper link, Figure 11 is a plan view showing diagrammatically one arrangement according to the invention as applied to the rear wheels of a vehicle, Figure 12 is a section on the line 12—12 of Figure 11, and—

Figure 13 is a section on the line 13—13 of Figure 11.

In the construction illustrated in Figures 1 to 9, the vehicle chassis frame comprises two main longitudinal chassis members A connected adjacent to the front of the vehicle by a transverse member $A^1$ and the general arrangement of the suspension apparatus comprises the following parts as shown diagrammatically in Figure 1.

Each of the road wheels B which is mounted on a stub axle $B^1$ carrying the usual supporting plate $B^2$ for the brake shoes is pivoted in known manner to a member $B^3$ rigidly secured to a wheel carrying member C. Each wheel carrying member C is rigidly secured to one end of a longitudinal arm D the other end of which is connected by a pivotal joint E to the adjacent main longitudinal frame member A. Each wheel carrying member C is also connected adjacent to its upper end to the adjacent longitudinal frame member A by a link F and adjacent to its lower end to the transverse member $A^1$ by a link G. Between the lower link G and brackets H rigidly secured to the chassis extend helical springs J which thus serve to support the chassis from the wheel carrying members and their associated parts.

Referring now to Figures 2–9, in which the construction diagrammatically illustrated in Figure 1 is shown in more detail, the wheel carrying member C is of flanged channel section as shown most clearly in Figures 3 and 5, the longitudinal arm D also being of channel section and being riveted or otherwise rigidly connected to the flange on the wheel carrying member, as shown at $C^1$ in Figure 5. At the upper end of the wheel carrying member C the sides of the channel are extended to form two lugs $C^2$ and the lower end of the wheel carrying member is constituted by a member $C^3$ which extends within the part C and is secured thereto at a point intermediate in its length by a bolt $C^4$ passing through a boss and at its upper end by a stud $B^4$ which is formed integral with the stub axle $B^3$ and passes through the wheel carrying member, including a boss $C^5$ on the member $C^3$ and the end of the longitudinal arm and carries a nut at its end whereby these parts are clamped together and the member $B^3$ is secured to the wheel carrying member. The lower end of the member $C^3$ is formed with a socket $C^6$ and the sides of the lower link G are extended at its outer end to form lugs $G^1$ through which passes a bolt whereby the end of the link G is connected through a rubber joint of the kind referred to above to the socket $C^6$.

The inner end of the lower link is also provided with lugs $G^2$ through which passes a bolt $G^3$ whereby this end of the link is connected to a ball member K lying between the lugs and through which the bolt passes, this ball member constituting the inner member of a ball and socket joint the outer member of which is formed in two parts $K^1$, $K^2$ secured by a screwthreaded ring $K^3$ in a housing $K^4$ which is rigidly connected to the transverse member $A^1$ of the chassis. The housing $K^4$ serves to contain the outer members of the ball and socket joints for connecting the inner ends of both the lower links G to the intermediate member $A^1$ of the chassis and also contains a bearing for a member L which is arranged between the two ball and socket joints and will be hereinafter referred to.

The upper link F is formed as shown in Figure 7 and comprises a rod-like part F provided with a socket $F^1$ at its outer end and a screwthread at its inner end at $F^2$ and a second part $F^3$ also provided with a socket $F^4$ at its outer end and a screwthreaded bore into which screws the adjacent screwthreaded end $F^2$ of the rod-like part, a sleeve $F^5$ surrounding the adjacent ends of the two parts, as shown. The socket $F^1$ surrounds a bolt passing through the lugs $C^2$ at the upper end of the wheel carrying member C with a rubber joint of the kind referred to interposed between the socket and the bolt. Similarly, the socket $F^4$ surrounds a bolt which passes through a lug $A^3$ secured to the chassis frame member A and a socket $A^4$ on the bracket H which is rigidly secured to the longitudinal frame member A and the transverse frame member $A^1$, a rubber joint of the kind referred to being interposed between the socket $F^4$ and the bolt.

The formation of the upper link F in two parts screwthreaded together in the manner described above permits free relative pivotal movement between the ends of this link about the longitudinal axis thereof to allow freely for the angular movement of the wheel carrying member about a transverse axis under the control of the longitudinal arm D.

The inner end of the longitudinal arm D is connected to the longitudinal frame member A by means of the bolt E which passes through a socket $A^5$ in a bracket $A^6$ secured to the frame member A and through the end proper of the longitudinal arm D and through a plate $D^1$ rigidly secured at one end to the longitudinal arm and spaced therefrom at its other end as indicated. Interposed between the bolt E and the socket $A^5$ is a rubber joint of the kind referred to.

The arrangement is such that the axes of the socket $F^1$ and $C^6$ and hence of the rubber joints associated therewith pass through or adjacent to an extension of the axis of the bolt E and its associated rubber joint.

Rigidly secured to the lower link G adjacent to its outer end is a seating $J^1$ for the lower end of the spring J while the upper end of this spring engages a seating $J^2$ on the under surface of the bracket H. The seating $J^2$ on the under surface of the bracket H is substantially horizontal while the seating $J^1$ on the lower link G is inclined somewhat as shown when the suspension apparatus is in its normal position so that as the wheel carrying member C rises relatively to the chassis and compresses the spring J, the seatings $J^1$ and $J^2$ for the two ends of the spring come nearer and nearer into parallelism. It will be seen that the inclination of the seating surface $J^1$ for the lower end of the spring also provides that the lower link G may have its cross-section of greatest depth immediately on the inside of the spring, that is to say where the stresses on this link are liable to be greatest.

Secured to the transverse frame member $A^1$ at a point adjacent to its end is a wedge-shaped rubber buffer M into contact with which the lower link G is adapted to come when the spring J is compressed beyond a predetermined amount, this buffer being of wedge-shaped form so that its action in checking upward movement of the wheel carrying member C is progressive.

The mechanism for causing deflection of the wheels B for steering purposes comprises a gear box N containing gearing whereby rotation of the steering wheel effects angular movement of an arm $N^1$. The free end of the arm $N^1$ is connected through a ball or like universal joint $N^2$ to one end of a link O the other end of which is connected by a universal joint $O^1$ to one end of an arm P the other end of which carries the member L which, as stated above, is pivoted in a bearing in the housing $K^4$. The arm P is connected by further ball or like joints $P^1$ to the inner ends of each of two links Q the outer ends of which are pivotally connected at $Q^1$ to arms rigidly secured to the deflectable stub axle members $B^1$, $B^2$ of the wheels B.

It will be seen that in the construction shown the wheel carrying member C is symmetrical about a centre line passing through the axes of the sockets $C^6$ and $F^1$ so that similar wheel carrying members can be employed for the wheel assemblies on either side of the vehicle.

In the arrangement shown also the upper link is brought nearer to the pivot of the longitudinal arm which reduces the degree of pivotal movement for which the bearings at the ends of the link have to allow. Again, the arrangement enables the transverse member $A^1$ of the chassis which should be in line with the spring brackets H and the lower link to be placed well forward in the chassis which is a convenience when it is desired to place an engine well forward in the chassis, for example, to give further leg room in the vehicle. Further, the arrangement provides a clear space across the chassis behind the wheel carrying member for transverse brake rods which can be arranged with their axes in a plane containing the axes of the two king pins connecting the deflectable axles $B^1$ to the members $B^3$.

Further, by constructing the apparatus as shown so that the centre line of each longitudinal arm intersects the center line of its associated wheel carrying member and the axis of the stub axle, then the upper and lower sides of the longitudinal arm itself can be made symmetrical with respect to a longitudinal centre line so that similar longitudinal arms can be employed on the two sides of the vehicle.

Figure 10 shows somewhat diagrammatically an alternative arrangement which may be adopted for the upper link of a suspension system as illustrated in Figures 1 to 9. In this construction the upper link $F^6$ is formed in a single piece with sockets $F^7$, $F^8$ at its ends. The socket $F^7$ corresponds to the socket $F^1$ in the construction shown in Figures 1 to 9 and is adapted to be secured to the upper end of the wheel carrying member C by means of a rubber joint of the kind referred to. The socket $F^8$, on the other hand, is connected through a rubber joint of the kind referred to and a bolt S to a fork member $S^1$ having formed integral therewith a pin $S^2$ screwthreaded at its outer end to receive a nut $S^3$. The pin $S^2$ passes freely through a hole in the bracket $S^4$ rigidly secured to the frame A and surrounding the pin $S^2$ are two rubber members $S^5$ which have parts lying respectively against the two faces of the bracket $S^4$ and parts which extend into the hole in the bracket $S^4$, these rubber members being clamped in position by the nut $S^3$ acting through a washer $S^6$. This arrangement permits a degree of oscillation of the link $F^6$ relatively to the bracket $S^4$ and also a degree of universal movement.

An arrangement corresponding to that shown for connecting the end of the link $F^6$ to the bracket $S^4$ may be employed for connecting either the other end the link $F^6$ to the wheel carrying member or for connecting one or other of the ends of the lower link to its associated part.

In the construction illustrated in Figures 11, 12 and 13, the frame members A are connected at their rear ends by a transverse member T and forwardly of their rear ends by a transverse member $T^1$. The wheel carrying members U on which the wheels $U^1$ are rotatably mounted are rigidly connected to longitudinal arms $U^2$ similar in general structure to the arms D in the construction shown in Figures 1 to 9 and pivoted at their inner ends by rubber joints, indicated at $U^3$, to the frame members A.

The wheel carrying members U are provided with a pair of lugs V to which is pivoted by a joint of the rubber type the outer end of an upper link W the inner end of which is similarly pivoted to a bracket V¹ secured to the transverse member T. Lower links X are connected by ball and socket joints X¹ to the lower portions of the wheel carrying members and by pivotal rubber joints X² to a casing Y for differential mechaism which is rigidly secured to the transverse member T. Interposed between and seating at their ends on the lower links and the ends of the member T are coil suspension springs Z.

The wheels U¹ are driven in known manner through the differential mechanism in the casing Y by separate shafts provided with universal joints and disposed in casings Y¹.

The axes of the rubber joints connecting the upper links W to the members V and V¹ and of the rubber joint connecting the lower link X to the casing Y all pass through or adjacent to the axis of the rubber joint U³.

The whole suspension apparatus according to the invention may be assembled with a transverse member adapted to be bolted direct to the chassis as a unit either for the front or rear wheels, thus enabling the suspension apparatus to be applied to vehicles with little or no alteration from previous practice in the general layout of the vehicle.

What I claim as my invention and desired to secure by Letters Patent is:—

1. Vehicle spring suspension apparatus including in combination a vehicle frame, a wheel carrying member, a longitudinal arm rigidly connected at one end to the wheel carrying member and pivotally connected at its other end to the frame, a lower transverse link pivotally connected at its outer end to the wheel carrying member and at its inner end to the frame, at least one helical suspension spring for supporting the frame from the wheel carrying member and having an axis which lies substantially vertically and intersects the lower link, and an upper link pivotally connected at its outer end to the wheel carrying member and at its inner end to the frame and lying in a vertical transverse plane displaced from the vertical transverse plane in which the lower link lies by a distance equal to at least half the external diameter of the spring.

2. Vehicle spring suspension apparatus including in combination a vehicle frame, a wheel carrying member, a longitudinal arm rigidly connected at one end to the wheel carrying member and at its other end to the frame, upper and lower transverse links each pivotally connected at its outer end to the wheel carrying member and at its inner end to the frame, these links lying in vertical transverse planes displaced from one another, and a helical suspension spring which when viewed in plan, lies wholly to that side of the upper link which is nearer the vertical transverse plan in which the lower link lies.

3. Vehicle spring suspension apparatus including in combination a vehicle frame, a wheel carrying member, a longitudinal arm rigidly connected at its other end to the frame, upper and lower transverse links each pivotally connected at its outer end to the wheel carrying member and at its inner end to the frame, these links lying in vertical transverse planes displaced from one another so that the lower link is more remote than the upper link from the point at which the longitudinal arm is pivoted to the frame, and a helical suspension spring having a substantially vertical axis and lying wholly to that side of the upper link which is nearer to the transverse plane in which the lower link lies.

4. Vehicle spring suspension apparatus including in combination a vehicle frame, a wheel carrying member, a longitudinal arm rigidly connected at one end to the wheel carrying member and pivotally connected at its other end to the frame, upper and lower transverse links each pivotally connected at its outer end to the wheel carrying member and at its inner end to the frame, these links lying in vertical transverse planes displaced from one another and each constructed and arranged to permit freely the angular movement of the wheel carrying member under the control of the longitudinal arm, and a helical suspension spring having a substantially vertical axis and lying wholly to that side of the upper link which is nearer to the vertical transverse plane in which the lower link lies.

5. Vehicle spring suspension apparatus including in combination a vehicle frame, a wheel carrying member, a longitudinal arm rigidly connected at one end to the wheel carrying member and pivotally connected at its other end to the frame, upper and lower transverse links each connected at its outer end to the wheel carrying member and at its inner end to the frame, these links lying in vertical transverse planes displaced from one another and at least one of them comprising two end parts adapted to rotate freely relatively to one another about the longitudinal axis of the link but prevented from free relative longitudinal movement, and a helical suspension spring having a substantially vertical axis and lying wholly in vertical transverse planes to the side of the upper link adjacent to the lower link.

6. Vehicle spring suspension apparatus including in combination a vehicle frame, a wheel carrying member, a road wheel rotatably supported on the wheel carrying member, a longitudinal arm rigidly connected at one end to the wheel carrying member and pivotally connected at its other end to the frame, an upper transverse link which lies in a vertical transverse plane behind the axis of rotation of the road wheel and is pivotally connected at its ends respectively to the wheel carrying member and to the frame, and a lower transverse link which lies in a vertical transverse plane in front of the axis of rotation of the road wheel and is pivotally connected at its ends respectively to the wheel carrying member and to the frame, each transverse link being constructed and arranged to permit freely the angular movement of the wheel carrying member under the control of the longitudinal arm and at least one of the links comprising two parts which are freely rotatable relatively to one another about the longitudinal axis of the link but are prevented from free longitudinal movement, and a suspension spring interposed between the vehicle frame and the apparatus connecting the wheel thereto.

7. Vehicle spring suspension apparatus including in combination a vehicle frame, a wheel carrying member, a longitudinal arm rigidly connected at one end to the wheel carrying member and pivotally connected at its other end to the frame, upper and lower transverse links each connected at its outer end to the wheel carrying member and at its inner end to the frame, these links lying in vertical transverse planes displaced from one another and the two ends of at least one of these links being formed separately and having interengaging screwthreads so that the two ends can rotate freely relatively to one another about the longitudinal axis of the link but are prevented from free relative longitudinal movement, and a helical suspension spring having a substantially vertical axis and lying wholly to that side of the upper link which is nearer to the vertical transverse plane in which the lower link lies.

8. Vehicle spring suspension apparatus including in combination a vehicle frame, a wheel carrying member, a road wheel rotatably supported on the wheel carrying member, a longitudinal arm rigidly connected at one end to the wheel carrying member and pivotally connected at its other end to the frame, an upper transverse link which lies in a vertical transverse plane behind the axis of rotation of the road wheel and is pivotally connected at its ends respectively to the wheel carrying member and to the frame, and a lower transverse link which lies in a vertical transverse plane in front of the axis of rotation of the road wheel and is pivotally connected at its ends respectively to the wheel carrying member and to the frame, each transverse link being constructed and arranged to permit freely the angular movement of the wheel carrying member under the control of the longitudinal arm and the ends of at least one of these links being formed separately and having interengaging screw-threads so that the two ends can rotate freely relatively to one another about the longitudinal axis of the link but are prevented from free relative longitudinal movement, and a suspension spring interposed between the vehicle frame and the apparatus connecting the wheel thereto.

9. Vehicle spring suspension apparatus including in combination a vehicle frame, a wheel carrying member, a longitudinal arm rigidly connected at one end to the wheel carrying member and pivotally connected at its other end to the frame, upper and lower transverse links each pivotally connected at its outer end to the wheel carrying member and at its inner end to the frame, at least one such pivotal connections being constituted by a ball and socket joint while the links lie in vertical transverse planes displaced from one another, and a helical suspension spring having a substantially vertical axis and lying wholly in vertical transverse planes to the side of the upper link adjacent to the lower link.

10. Vehicle spring suspension apparatus including in combination a vehicle frame, a wheel carrying member, a longitudinal arm rigidly connected at one end to the wheel carrying member and at its other end to the frame, upper and lower transverse links each pivotally connected at its outer end to the wheel carrying member and at its inner end to the frame, these links lying in vertical transverse planes displaced from one another, a helical suspension spring having a substantially vertical axis and lying wholly in vertical transverse planes to the side of the upper link adjacent to the lower link, a seating for one end of a helical suspension spring on the frame, and a seating for the other end of the suspension spring on the lower link, the plane of the seating on the frame being so inclined to that of the seating on the lower link when the suspension apparatus is in its normal position that the seatings come nearer and nearer into parallelism as the wheel carrying member rises from its normal position relatively to the frame.

11. Vehicle spring suspension apparatus including in combination a vehicle frame, a wheel carrying member, a road wheel rotatably supported on the wheel carrying member, a longitudinal arm rigidly connected at one end to the wheel carrying member and pivotally connected at its other end to the frame, an upper transverse link which lies in a vertical transverse plane behind the axis of the road wheel and is pivotally connected at its ends respectively to the wheel carrying member and to the frame, a lower transverse link which lies in a vertical transverse plane in front of the axis of rotation of the road wheel and is pivotally connected at its ends respectively to the wheel carrying member and to the frame, a helical suspension spring, a seating for one end of the suspension spring on the frame, and a seating for the other end of the suspension spring on the lower link, the plane of the seating on the lower link being so inclined to the plane of the seating on the frame when the suspension apparatus is in its normal position that the seatings come nearer and nearer into parallelism as the wheel carrying member rises from its normal position relatively to the frame.

12. Vehicle spring suspension apparatus including in combination a vehicle frame, a wheel carrying member, a longitudinal arm rigidly connected at one end to the wheel carrying member and at its other end to the frame, upper and lower transverse links each pivotally connected at its outer end to the wheel carrying member and at its inner end to the frame, these links lying in vertical transverse planes displaced from one another, a helical suspension spring having a substantially vertical axis and lying wholly in vertical transverse planes to the side of the upper link adjacent to the lower link, and a rubber buffer interposed between the frame and the lower link, this buffer being of wedge-shaped form so that it comes progressively into action as the wheel carrying member rises beyond a predetermined point.

ALBERT HENRY GODFREY GIRLING.